United States Patent Office 2,811,536
Patented Oct. 29, 1957

2,811,536

DIPHTHALIDES

Donald D. Wheeler and David C. Young, Midland, Mich., assignors to The Dow Chemical Company, Midland, Mich., a corporation of Delaware No Drawing. Application April 30, 1956,
Serial No. 581,334

5 Claims. (Cl. 260—343.3)

This invention is concerned with diphthalides having the formula

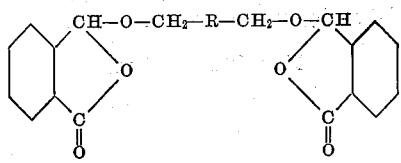

In this and succeeding formulae, R represents an ethenylene or ethynylene radical. This invention further includes a method for preparing these compounds. These new compounds are amber colored oils or solids, somewhat soluble in many organic solvents such as benzene, toluene and acetone and substantially insoluble in water. They have utility as microbicides and are adapted to be employed for the control of bacterial organisms.

These novel compounds may be prepared by causing phthalaldehydic acid to react with an appropriate dihydroxy compound having the formula $$HO—CH_2—R—CH_2—OH$$

to produce the desired diphthalide and water of reaction. The terms "phthalaldehydic acid" and "3-hydroxyphthalide" refer to a compound having the structure

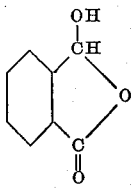

Phthalaldehydic acid is often represented in the literature as having the structure

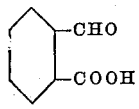

However, the acid employed in this invention and prepared as hereinafter described exists almost entirely in the closed ring 3-hydroxyphthalide structure as observed from a study of its infrared spectrum. Infrared data also indicate the diphthalide product to have the closed ring 3-hydroxyphthalide structure with the open chain ester sometimes being formed as a by-product.

In the synthesis, good results are obtained when substantially 2 molar proportions of phthalaldehydic acid is employed for each molar proportion of employed dihydroxy compound. The relative amounts of the reactants are not critical in the formation of the desired product. However, phthalaldehydic acid, if used in large excess or under conditions of high temperature, may form an anhydride by-product. The reaction takes place smoothly in the temperature range of from 15° to 150° C. but a range of from 90° to 130° C. is considered preferable from a practical standpoint such as rate of reaction or convenience of operation. Solvents such as benzene and toluene may be employed as reaction medium, if desired. The product obtained may be separated from the water of reaction by vaporization of the latter.

In one mode of carrying out the reaction, phthalaldehydic acid and the appropriate dihydroxy compound are mixed and heated until the water of reaction begins to reflux and maintained under reflux from 0.5 to 3 hours. At the end of this period, the pressure is reduced to about 15 millimeters and the mixture heated to about 150° C. to remove the water of reaction and low boiling material, and to obtain the desired diphthalide as residue.

In an alternative method, phthalaldehydic acid and the dihydroxy compound are mixed and heated in the temperature range of from 110° to 130° C. from 0.5 to 3 hours. The mixture is then poured into water to precipitate the product as an oil or a solid. The water is decanted from the precipitate and the latter washed with warm water. The product, if a liquid, is dissolved in benzene and the resulting solution heated to remove any remaining water as a benzene-water azeotrope and then to distill the solvent. The residue is a purified diphthalide. The product, if a solid, is filtered from the aqueous mixture, washed and dried.

The following examples illustrate the invention but are not to be construed as limiting.

*Example 1.—3,3'-(2-butenylenedioxy)diphthalide*

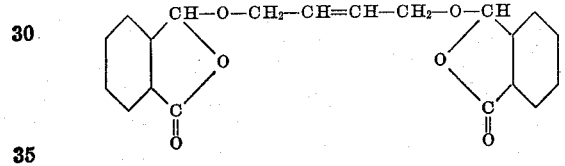

22.0 grams (0.25 mole) of 2-butene-1,4-diol and 75.0 grams (0.50 mole) of phthalaldehydic acid were mixed and heated at 115° C. under reflux for 2 hours. The pressure on the system was reduced to about 15 millimeters and the temperature raised to 150° C. to distill low boiling material and to obtain an oily 3,3'-(2-butenylenedioxy)diphthalide product in a yield of 84 grams or 95.5 percent of theoretical. The latter had a refractive index $n_D^{60}$ of 1.5605.

*Example 2.—3,3'-(2-butynylenedioxy)diphthalide*

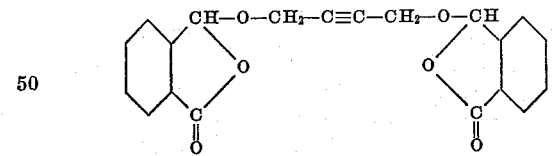

21.5 grams (0.25 mole) of 2-butyne-1,4-diol and 75.0 grams (0.5 mole) of phthalaldehydic acid were mixed and heated at 125° C. under reflux for 2 hours. The pressure on the system was reduced to 15 millimeters and the water distilled out. The residual oil was poured into 600 milliliters of water to obtain a 3,3'-(2-butynylenedioxy)diphthalide product as a gummy solid. The latter, on standing, turned to a tan-colored solid, which after washing with water and drying, melted from 150° to 155° C. The product amounted to 68 grams or 78 percent of theoretical.

The products of this invention are effective as germicides and may be employed for the control of bacterial organisms. In a representative operation 3,3'-(2-butynylenedioxy)diphthalide was added to bacteriological media to give a concentration of 0.05 percent and the media inoculated with *Staphylococcus aureus* and incubated at 30° C. for four days. At the end of this period, complete inhibition of growth of the test organism was observed.

The phthalaldehydic acid employed in this invention may be prepared by first photochlorinating o-xylene to obtain α,α,α,α',α'-pentachloro-o-xylene by passing chlorine gas into o-xylene while illuminating with sun lamps. The resulting chlorinated o-xylene is then heated with an aqueous solution containing from 4 to 35 percent by weight of a metal halide such as ferric chloride to obtain phthalaldehydic acid, as more fully disclosed and claimed in a copending application of James D. Head and Owen D. Ivins, Serial Number 279,682, filed March 31, 1952, now Patent No. 2,748,162.

We claim:
1. A diphthalide having the formula

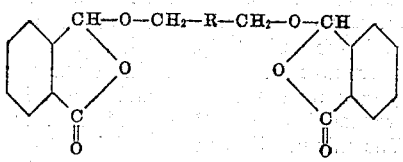

wherein R represents a radical selected from the group consisting of ethenylene and ethynylene.
2. 3,3'-(2-butenylenedioxy)diphthalide.
3. 3,3'-(2-butynylenedioxy)diphthalide.

4. A method for preparing a diphthalide having the formula

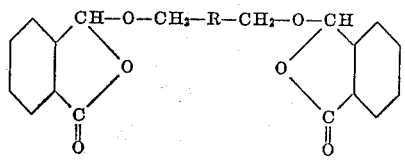

wherein R represents a radical selected from the group consisting of ethenylene and ethynylene which comprises the step of heating phthalaldehydic acid with a dihydroxy compound having the formula

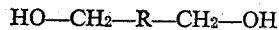

HO—CH$_2$—R—CH$_2$—OH wherein R is as defined above, at a temperature of from 90° to 130° C. for a time sufficient to allow completion of the reaction.
5. A method according to claim 4 wherein two molar proportions of phthalaldehydic acid and one molar proportion of the dihydroxy compound are employed.

No references cited.